United States Patent [19]

Suzuki

[11] 4,443,081

[45] Apr. 17, 1984

[54] METERING DEVICE OF A SINGLE LENS REFLEX CAMERA

[75] Inventor: Takashi Suzuki, Yokohama, Japan

[73] Assignee: Canon Kabushiki Kaisha, Tokyo, Japan

[21] Appl. No.: 371,017

[22] Filed: Apr. 22, 1982

[30] Foreign Application Priority Data

May 9, 1981 [JP] Japan ................................ 56-69769

[51] Int. Cl.³ ............................................. G03B 7/099
[52] U.S. Cl. ....................................... 354/479; 354/56
[58] Field of Search ........................ 354/23 R, 56, 59

[56] References Cited

U.S. PATENT DOCUMENTS

| 3,464,337 | 9/1969 | Trankner | 354/56 |
| 4,075,640 | 2/1978 | Ueda et al. | 354/59 X |
| 4,348,088 | 9/1982 | Yamamichi et al. | 354/59 X |

*Primary Examiner*—Michael L. Gellner
*Attorney, Agent, or Firm*—Fitzpatrick, Cella, Harper & Scinto

[57] ABSTRACT

A plate-like optical element is disposed at the bottom of the dark chamber of a single lens reflex camera. This plate-like optical element receives the light from a mirror obliquely disposed on the optical axis of a picture-taking lens, or a shutter curtain or a film surface. The plate-like optical element causes this light to travel in a direction along the bottom and enter a light receiving element.

2 Claims, 7 Drawing Figures

METERING DEVICE OF A SINGLE LENS REFLEX CAMERA

BACKGROUND OF THE INVENTION

1. Field of the Invention

This invention relates to a metering device of a single lens reflex camera, and more particularly to a metering device of a single lens reflex camera in which part of a light beam to pass from the picture-taking lens to a film surface is reflected, for example, by a sub-mirror provided rearwardly of a quick return mirror or by the film surface itself, whereby this light is metered.

2. Description of the Prior Art

As the metering device in a single lens reflex camera, there is known one in which metering is accomplished by a set of a large-diametered condenser lens 3 disposed on the lower surface of a mirror box 1 and substantially facing the center of a film 2 and a light receiving element 4 installed on the condensing surface of the condenser lens, as shown in FIG. 1 of the accompanying drawings. A disadvantage inherent to such device is that the set of the condenser lens 3 and the light receiving element 4 has a considerably great thickness in the direction of the optical axis of the lens 3 and it occupies the entire space from the upper surface of the mirror box 1 to the bottom plate of the camera and therefore, the various mechanisms originally existing in that space must be moved into other space and this gives rise to difficulties in designing of the camera or that some cameras have a mechanism such as a diaphragm-interlocked lever which can hardly be moved from that space into other space and such cameras cannot at all adopt said device.

SUMMARY OF THE INVENTION

It is an object of the present invention to provide a metering device of which the size in a direction perpendicular to the optical axis of a picture-taking optical system is small. Such object is achieved by disposing a plate-like condensing element substantially parallel to the optical axis at the side opposite to a focusing screen with respect to the optical axis of the picture-taking optical system and causing light to travel in a direction parallel to the optical axis by this element and to be received by a light receiving element.

The invention will become fully apparent from the following detailed description thereof taken in conjunction with the accompanying drawings.

DESCRIPTION OF THE PREFERRED EMBODIMENTS

Figure 1:
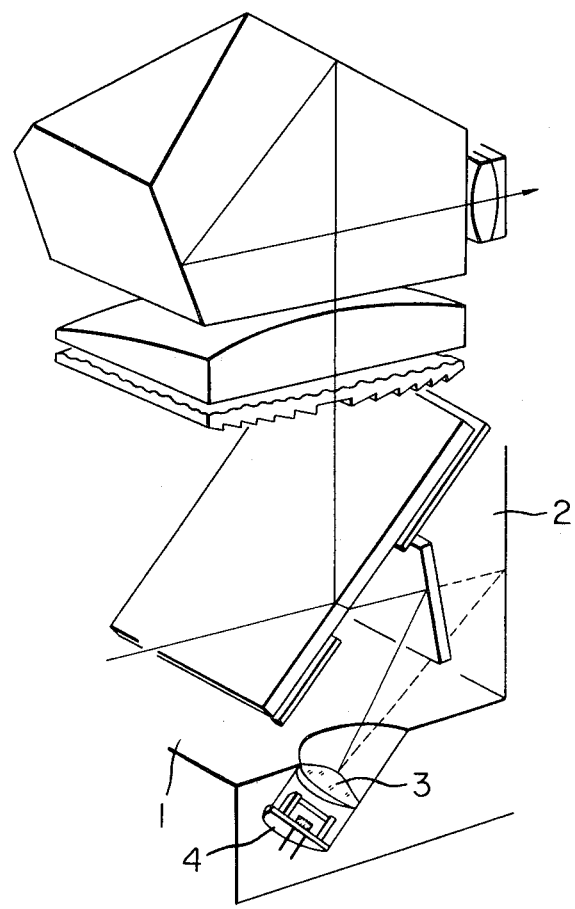
FIG. 1 illustrates the metering device according to the prior art.
Figure 2:
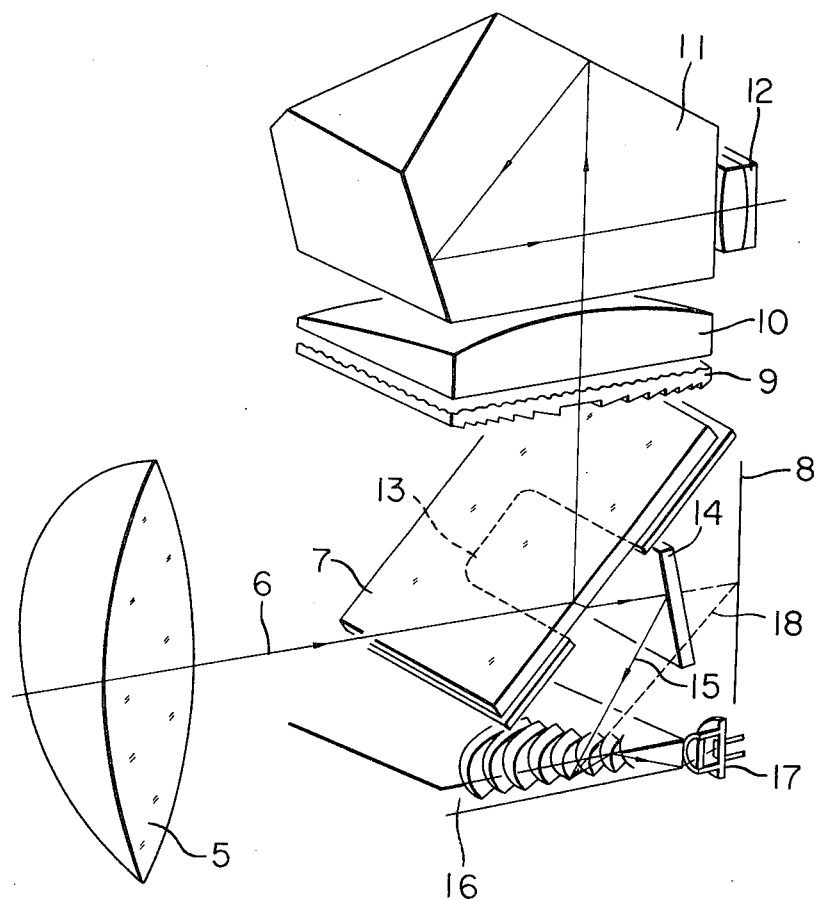
FIG. 2 illustrates the metering device of the present invention.

Referring to FIG. 2 which shows an embodiment of the present invention, reference numeral 5 designates a picture-taking lens and a jump-up mirror 7 is disposed at an angle of 45° with respect to the optical axis 6 of the picture-taking lens. This jump-up mirror 7 is retractable out of the light path to a film 8 during exposure. Reference numeral 9 designates a focusing screen on the surface of which an image may be formed by the light from the mirror 7, reference numeral 10 denotes a condenser lens, reference numeral 11 designates a pentadach prism, and reference numeral 12 denotes an eyepiece. These constitute a viewfinder optical system. Designated by 13 is a transmitting portion of the mirror 7. A sub-mirror 14 is disposed behind the transmitting portion so that a light 15 passed through the transmitting portion of the mirror 7 is directed to a plate-like condensing optical element 16 by the sub-mirror 14. This plate-like condensing optical element 16 is disposed substantially parallel to the optical axis at the opposite side of the focusing screen 9 with respect to the optical axis 6 and outside the incident light path to the film. Denoted by 17 is a light receiving element disposed at the light condensing point of the optical element 16.

Accordingly, during non-exposure, part of the picture-taking light passes through the central portion of the mirror 7 and is reflected by the sub-mirror 14 and the optical element 16 and enters the light receiving element 17, whereby it is metered.

During exposure, the jump-up mirror 7, together with the sub-mirror 14, is retracted out of the light path. Thus, the light 18 reflected by the film surface 8 enters the condensing optical element 16 and is likewise metered by the light receiving element 17.

The plate-like condensing optical element 16 will now be described in detail.

Figure 3:
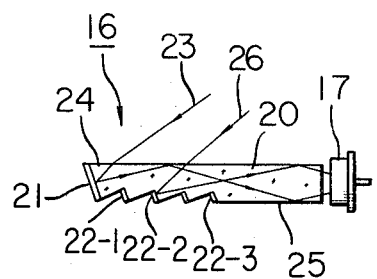
FIG. 3 shows a plate-like condensing optical element.
Figure 4:
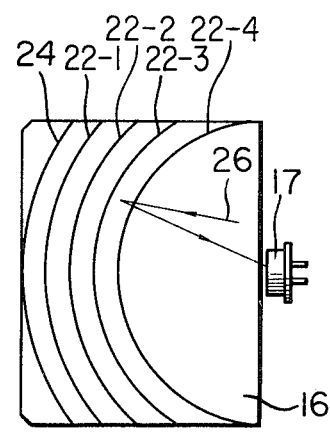
FIG. 4 is a top plan view of the condensing optical element of FIG. 3.

FIG. 3 is a cross-sectional view of the optical element 16 of FIG. 2. This element comprises a transparent substrate 20 having one end surface thereof formed into a reflecting surface 21 and having the lower surface thereof formed with grating lines of diffraction grating ot microprism structure lines of Fresnel lines 22-1, 22-2 and 22-3. This surface may be subjected to a mirror surface treatment by evaporation of silver, Al or the like. The light 23 incident on this optical element 16 is reflected by the end surface mirror 21 and totally reflected by the upper surface 24 and the lower surface 25 of the substrate 20 and travels toward the light receiving element 17. Also, the incident light 26 is diffracted or reflected by the lines 22 and totally reflected by the surfaces 24 and 25 and travels toward the light receiving element 17. Accordingly, the incident lights 23 and 25 are directed in a direction substantially parallel to the optical axis 6 by this optical element. The lines are curved when viewed from thereabove as shown in FIG. 4 and therefore, the light is condensed on the light receiving element 17. To make the light condensing performance highly efficient or to render the metering distribution into a desired one, the angles formed by the reflecting surfaces 21 and 22 with the lower surface may be varied in location. This optical element can be mass-produced by forming linear projections or concave lines in a matrix and embossing a plastic therein.

Figure 5:
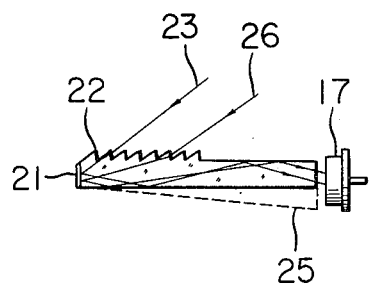
FIG. 5 shows another embodiment of the plate-like condensing optical element.

FIG. 5 shows another embodiment of the condensing element 16. In the embodiment of FIG. 3, the diffraction grating is formed in the lower surface, while in the present embodiment, a diffraction grating 22 is formed in the upper surface and incident lights 23 and 26 may be introduced into the element by this diffraction grating 22. Also, the lower surface 25 may be inclined as indicated by dotted line in order that the light introduced and travelling in the direction of the optical axis while repeating the inner surface reflection may be prevented from effecting re-coupling on the diffraction grating.

Figure 6:
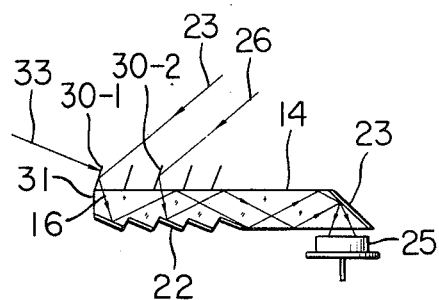
FIGS. 6 and 7 show a further embodiment of the plate-like condensing optical element.
Figure 7:
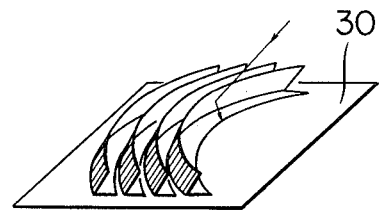

FIG. 6 shows an example in which condensers 30-1 30-2, . . . and condensing plate 16 are combined. The incident lights 23 and 26 are first reflected by the blade 30 of the condenser and enters the condensing plate 16 and is reflected toward the light receiving element by the diffraction grating surface or microprism surface 22. One end surface 31 of the condensing plate 14 may be slantly cut and formed into a reflecting mirror so as to direct light to the light receiving element 15 provided below the condensing plate. The function of the blade 30 of the condenser is to reflect the incident lights 23 and 26 and effectively direct the lights into the condensing plate and also prevent part 33 of the imaging light beam from entering the condensing plate or from being reflected by the surface of the condensing plate and entering the film surface. A perspective view of the Venetian blind structure of the condenser 30 is shown in FIG. 7.

As is apparent from what has been described above in detail, the metering device of the present invention can effectively direct light to the light receiving element by a thin condensing plate of a thickness of the order of 0.5–2 mm having a minute structure and therefore can be mounted without the construction and arrangement of the mechanism of the conventional cameras being seriously changed. Further, as compared with the conventional system, the light introducing area of this device can be increased to several times and this leads to the effect of enabling the metering of objects of low brightness.

What I claim is:

1. A metering device of a single lens reflex camera comprising:

a picture-taking optical system for forming an image of an object on a picture-taking plane;

a focusing screen disposed at one side of the optical axis of said picture-taking optical system;

a deflector disposed between said picture-taking optical system and said picture-taking plane, at least part of the light from said picture-taking optical system being directed to said focusing screen by said deflector, whereby an object image for observation is formed on said focusing screen; and a plate-like condensing optical system located outside the light path of said picture-taking optical system between said picture-taking optical system and said picture-taking plane and disposed substantially in parallel to said optical axis, said plate-like condensing optical system having a diffraction grating of arcuate shape, the light from said picture-taking optical system being reflectively directed to said plate-like condensing optical system and refracted to a light receiving element through said plate.

2. A metering device of a single lens reflex camera comprising:

a picture-taking optical system mounted on one end surface of a dark chamber of said camera, said optical system being effective to form an image of an object on another end surface opposed to said one end surface;

a focusing screen which is attached to the upper portion of said camera and on which an object image for observation is formed; and a plate-like condensing optical system attached to the lower portion of said camera and having a diffraction grating of arcuate shape, the light from said picture-taking optical system being reflectively directed to said plate-like condensing optical system and refracted to a light receiving element through said plate.

* * * * *